(12) United States Patent
Hurter

(10) Patent No.: US 10,373,010 B2
(45) Date of Patent: Aug. 6, 2019

(54) RANDOM PATH GENERATION UPON FUNCTIONAL DECOMPOSITION

(71) Applicant: ECOLE NATIONALE DE L'AVIATION CIVILE, Toulouse (FR)

(72) Inventor: Christophe Hurter, Toulouse (FR)

(73) Assignee: ECOLE NATIONALE DE L'AVIATION CIVILE, Toulouse (FR)

( * ) Notice: Subject to any disclaimer, the term of this patent is extended or adjusted under 35 U.S.C. 154(b) by 62 days.

(21) Appl. No.: 15/661,794

(22) Filed: Jul. 27, 2017

(65) Prior Publication Data
US 2018/0032836 A1 Feb. 1, 2018

(30) Foreign Application Priority Data
Aug. 1, 2016 (EP) .................................. 16305997

(51) Int. Cl.
*G06K 9/46* (2006.01)
*G06K 9/62* (2006.01)
*G06T 11/20* (2006.01)

(52) U.S. Cl.
CPC ......... *G06K 9/4638* (2013.01); *G06K 9/6224* (2013.01); *G06T 11/206* (2013.01)

(58) Field of Classification Search
None
See application file for complete search history.

(56) References Cited

FOREIGN PATENT DOCUMENTS

WO 99/34313 A2 7/1999

OTHER PUBLICATIONS

Amit Jardosh, Elizabeth M. Belding-Royer, Kevin C. Almeroth, and Subhash Suri. 2003. Towards realistic mobility models for mobile ad hoc networks. In Proceedings of the 9th annual international conference on Mobile computing and networking (MobiCom '03). ACM, New York, NY, USA, 217-229 (Year: 2003).*
Bekhor, S., Ben-Akiva, M.E. & Ramming, M.S. Ann Oper Res (2006) 144: 235. (Year: 2006).*
E. Frejinger, M. Bierlaire, M. Ben-Akiva, Sampling of alternatives for route choice modeling, Transportation Research Part B: Methodological, vol. 43, Issue 10, 2009, pp. 984-997 (Year: 2009).*
European Search Report for 16305997.5 dated Feb. 28, 2017.
Hong Zhou et al: "Edge bundling in information visualization", Tsinghua Science and Technology, vol. 18, No. 2, Apr. 1, 2013 (Apr. 1, 2013), pp. 145-156.

(Continued)

*Primary Examiner* — Motilewa Good Johnson
(74) *Attorney, Agent, or Firm* — Meagher Emanuel Laks Goldberg & Liao, LLP

(57) ABSTRACT

A method of defining a path model from a set of realistic paths is provided, where each path in the set of realistic paths is expanded on piece-wise polynomial basis, and a respective centroid function and sequence of eigenfunctions calculated for each expanded representation. A set of principle paths representing the major variation of this set of paths is obtained describing the variations of the set of realistic paths with respect to the centroid. The path model thus comprises a linear combination of said principle paths. The path model may be used as the basis for the generation of new curves having similar characteristics to the original set of realistic paths.

12 Claims, 6 Drawing Sheets

(56) References Cited

OTHER PUBLICATIONS

Ellis G et al: "A Taxonomy of Clutter Reduction for Information Visualisation", IEEE Transactions on Visualization and Computer Graphics, IEEE Service Center, Los Alamitos, CA, US, vol. 13, No. 6, Nov. 1, 2007 (Nov. 1, 2007), pp. 1216-1223.
I Herman et al: "Graph visualization and navigation in information visualization: A survey", IEEE Transactions on Visualization and Computer Graphics, Jan. 1, 2000 (Jan. 1, 2000), pp. 24-43, XP055181092, New York.
Anonymous: "A Navigation Aid for Graph Visualization Tools: The Minimap Apparatus", Research Disclosure, vol. 41, No. 408, Apr. 1, 1998 (Apr. 1, 1998), Havant, UK, article No. 408161.
Hurter, C., Ersoy, O., and Telea, A. in "Graph Bundling by Kernel Density Estimation." Eurographics Conference on Visualization 2012 vol. 31, No. 3, pp. 865-874, Jun. 25, 2012.
Vsevolod Peysakhovich, Christophe Hurter, A. Talea "Attribute-Driven Edge Bundling for General Graphs with Applications" in Trail Analysis. PacificVis, Conference Paper—Apr. 2015.
Zwan, M., Codreanu, V., and Telea, A. "CUBu: Universal real-time bundling for large graphs." IEEE Trans-actions on Visualization and Computer Graphics, PP(99):1-1, 2016.
Gansner, E., Hu, Y., North, S., and Scheidegger, C. "Multilevel agglomerative edge bundling for visualizing large graphs." In Proc. PacificVis, pp. 187-194, 2011.
Dickerson, M., Eppstein, D., Goodrich, M. T., and Meng, J. Y. "Confluent Drawings: Visualizing Non-planar Diagrams in a PlanarWay." In Liotta, G., editor, Graph Drawing, No. 2912 in Lecture Notes in Computer Science, pp. 1-12. 2003, Springer Berlin Heidelberg.
Phan, D., Xiao, L., Yeh, R., Hanrahan, P., and Winograd, T. "Flow map layout" in Proceedings of the Proceedings of the 2005 IEEE Symposium on Information Visualization, INFOVIS '05, pp. 29—. Washington, DC, USA. IEEE Computer Society, 2005.
Qu, H., Zhou, H., and Wu, Y. (2007). In "Controllable and Progressive Edge Clustering for Large Networks" published by Kaufmann, M. and Wagner, D., in Graph Drawing, No. 4372, Lecture Notes in Computer Science, pp. 399-404. Springer Berlin Heidelberg.
Zhou, H., Yuan, X., Cui, W., Qu, H., and Chen, B. in "Energy-Based Hierarchical Edge Clustering of Graphs" published in Visualization Symposium, 2008. PacificVIS '08. IEEE Pacific, pp. 55-61 (2008).
Holten, Danny: "Hierarchical edge bundles: Visualization of adjacency relations in hierarchical data" IEEE TVCG, 12(5):741-748, 2006.
Gansner and Koren "Improved Circular Layouts" published in Kaufmann, M. and Wagner, D., editors, Graph Drawing, No. 4372 in Lecture Notes in Computer Science, pp. 386-398, 2006. Springer Berlin Heidelberg.
Cui, W., Zhou, H., Qu, H., Wong, P. C., and Li, X. in "Geometry-Based Edge Clustering for Graph Visualization", IEEE Transactions on Visualization and Computer Graphics, 14(6):1277-1284, 2008.
Lambert, A., Bourqui, R., and Auber, D. in "3D edge bundling for geographical data visualization", Proc. Information Visualisation, pp. 329-335, 2010.
Lambert, A., Bourqui, R., and Auber, D. "Winding roads: Routing edges into bundles" CGF, 29(3):432-439, 2010.
Dwyer, T., Marriott, K., and Wybrow, M. in "Integrating edge routing into force-directed layout" Proc. Graph Drawing, pp. 8-19, 2006.
Holten, D. and van Wijk, J. J. in "A user study on visualizing directed edges in graphs" Proc. ACM CHI, pp. 2299-2308, 2009.
Selassie, D., Heller, B., and Heer, J. in Divided edge bundling for directional network data. IEEE TVCG, 19(12):754-763, 2011.
Ramsay, J. and Silverman, B. (2005). "Functional Data Analysis",Springer Series in Statistics, Springer.
Yao, F., Müller, H.-G., and Wang, J.-L. "Functional linear regression analysis for longitudinal data." Ann. Statist., 33(6):2873-2903, 2005.
Ersoy, O., Hurter, C., Paulovich, F., Cantareiro, G., and Telea, A. "Skeleton-Based Edge Bundling for Graph Visualization." IEEE Transactions, 17 (12), pp. 2364-2373, 2011.
Telea, A. and Ersoy, O. "Image-based path Bundles: Simplified Visualization of Large Graphs." Proceedings of the 12th Eurographics / IEEE—VGTC Conference on Visualization, EuroVis'10, pp. 843-852, 2010.
Nyström, E. J. "Über die praktische Auflösung von Integralgleichungen mit Anwendungen auf Randwertaufgaben." Acta Mathematica, 54(1):185-204, 1930.

\* cited by examiner

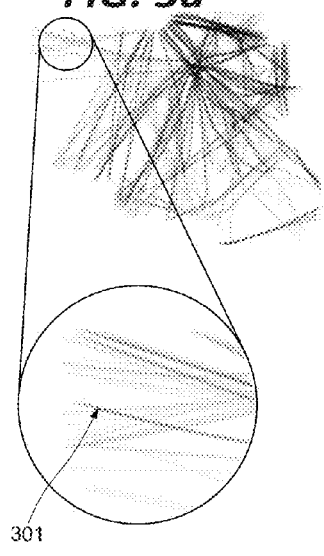
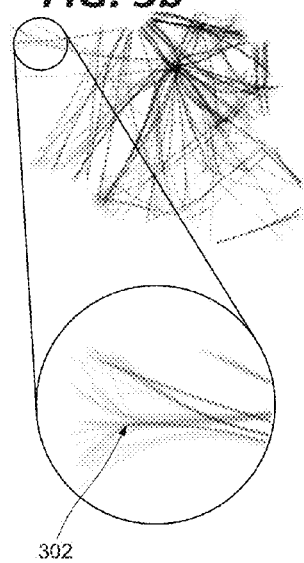
FIG. 3a FIG. 3b FIG. 3c
FIG. 4
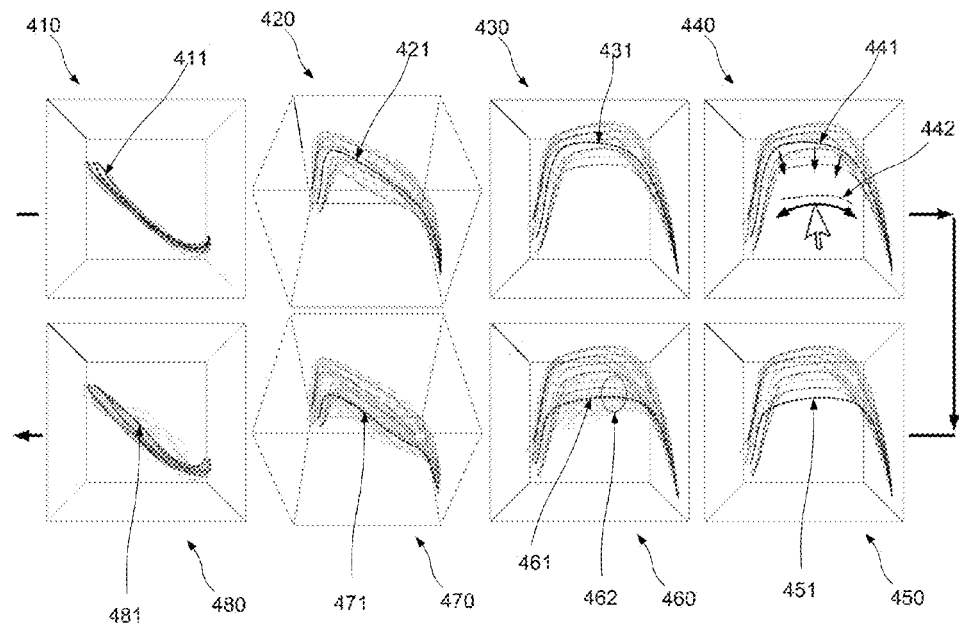

RANDOM PATH GENERATION UPON FUNCTIONAL DECOMPOSITION

FIELD OF THE INVENTION

Path Bundling techniques reduce visual clutter by aggregating paths into bundles. Paths may also be referred to as edges or curves, and for the purposes of the present description these terms are considered to be synonymous. Path Bundling provides a visual trade-off between empty spaces and Path overdrawing. A number of dedicated algorithms for Path Bundling are known. These algorithms vary in terms of complexity, type of applicable data-sets, and output results. A general objective in this field is to develop faster algorithms that can handle even larger data sets. A number of general approaches are known:

Kernel Density Edge Bundling provides the most scalable algorithm as discussed by Hurter, C., Ersoy, O., and Telea, A. in "Graph Bundling by Kernel Density Estimation. (31):865-874"

Attribute Based Edge Bundling as described by Vsevolod Peysakhovich, Christophe Hurter, A. T. (2015) in Attribute-Driven Edge Bundling for General Graphs with Applications in Trail Analysis. *PacificVis*. gives an extension of this algorithm to support directed graph and multidimensional bundling.

CuBu as described by van der Zwan, M., Codreanu, V., and Telea, A. (2016). In Cubu: Universal real-time bundling for large graphs. *IEEE Trans-actions on Visualization and Computer Graphics*, PP(99):1-1, accomplished its fastest implementation by means of an optimised implementation on a modern graphics card.

BACKGROUND OF THE INVENTION

Edge simplification algorithms have been subject to an increased research interest with numerous improvements and enhancements in recent years.

On the geometry level, dense edge visualizations can be uncluttered by using Path Bundling techniques. They trade clutter for overdraw by routing geometrically and semantically related edges along similar paths. This improves readability in terms of finding groups of nodes related to each other by tracing groups of paths to form bundles, which are separated by whitespace as described by Gansner, E., Hu, Y., North, S., and Scheidegger, C. in "Multilevel agglomerative edge bundling for visualizing large graphs." In *Proc. PacificVis*, pages 187-194. Meanwhile Dickerson et al. merge edges by reducing non-planar graphs to planar ones (Dickerson, M., Eppstein, D., Goodrich, M. T., and Meng, J. Y. (2003). Confluent Drawings: Visualizing Non-planar Diagrams in a PlanarWay. In Liotta, G., editor, *Graph Drawing*, number 2912 in Lecture Notes in Computer Science, pages 1-12. Springer Berlin Heidelberg.)

An early edge bundling technique was "flow map visualization", which produces a binary clustering of nodes in a directed graph representing flows as described by Phan, D., Xiao, L., Yeh, R., Hanrahan, P., and Winograd, T. in "Flow map layout in *Proceedings of the Proceedings of the 2005 IEEE Symposium on Information Visualization*, INFOVIS '05, pages 29-. Washington, D.C., USA. IEEE Computer Society. The control meshes of maps are used by several authors to route curved edges, for example as described by Qu, H., Zhou, H., and Wu, Y. (2007). in "Controllable and Progressive Edge Clustering for Large Networks" published by Kaufmann, M. and Wagner, D., in *Graph Drawing*, number 4372, Lecture Notes in Computer Science, pages 399-404. Springer Berlin Heidelberg, or by Zhou, H., Yuan, X., Cui, W., Qu, H., and Chen, B. in "Energy-Based Hierarchical Edge Clustering of Graphs" published in *Visualization Symposium, 2008. Pacific VIS '08. IEEE Pacific*, pages 55-61. These techniques were later generalized into Edge Bundling approaches that use a graph structure to route curved edges. Holten pioneered this approach for compound graphs by routing edges along the hierarchy layout using B-splines in "Hierarchical edge bundles: Visualization of adjacency relations in hierarchical data" *IEEE TVCG*, 12(5): 741-748. Gansner and Koren bundled edges in a similar circular node layout by area optimization metrics in "Improved Circular Layouts" published in Kaufmann, M. and Wagner, D., editors, *Graph Drawing*, number 4372 in Lecture Notes in Computer Science, pages 386-398. Springer Berlin Heidelberg. Control meshes can also be used for edge clustering in graphs as described in the Qu et al and Zhou et al publications mentioned above. A Delaunay-based extension called Geometric-Based Edge Bundling (GBEdge Bundling) as described by Cui, W., Zhou, H., Qu, H., Wong, P. C., and Li, X. in "Geometry-Based Edge Clustering for Graph Visualization", *IEEE Transactions on Visualization and Computer Graphics*, 14(6):1277-12841; and "Winding Roads" (WR) that use Voronoï diagrams for 2D and 3D layouts are also known, from Lambert, A., Bourqui, R., and Auber, D. in "3D edge bundling for geographical data visualization", *Proc. Information Visualisation*, pages 329-335, and from Lambert, A., Bourqui, R., and Auber, D. "Winding roads: Routing edges into bundles" *CGF*, 29(3): 432-439.

A popular technique is the Force-Directed edge layout technique which uses curved edges to minimize crossings, and implicitly creates bundle-like shapes, as described by Dwyer, T., Marriott, K., and Wybrow, M. in "Integrating edge routing into force-directed layout" *Proc. Graph Drawing*, pages 8-19. Force-Directed Edge Bundling (FDEdge Bundling) creates bundles by attracting control points on edges close to each other as described by Holten, D. and van Wijk, J. J. in "A user study on visualizing directed edges in graphs" *Proc. ACM CHI*, pages 2299-2308, and was adapted to separate bundles running in opposite directions by Selassie, D., Heller, B., and Heer, J. in "Divided edge bundling for directional network data. IEEE TVCG, 19(12): 754-763 and Stark, H. and Woods, J. in "*Probability, random processes, and estimation theory for engineers.*" Prentice-Hall. The MINGLE method uses multilevel clustering to significantly accelerate the bundling process as presented by Gansner, E., Hu, Y., North, S., and Scheidegger, C. in "Multilevel agglomerative edge bundling for visualizing large graphs", *Visualization Symposium (PacificVis)*, 2011 *IEEE Pacific*, pages 187-194.

Computation times for larger graphs struggle with the algorithmic complexity of the Edge Bundling problem. This makes scalability a major issue when using the Edge Bundling techniques mentioned above. Accordingly, it remains desirable to provide a more computationally efficient, scalable, configurable and flexible approach to bundling operations.

It is also desirable to develop clearer representations of bundled paths.

It is also desirable to develop mechanisms for the generation of families of paths.

SUMMARY OF THE INVENTION

In accordance with a first aspect there is provided an apparatus for defining a path model from a set of realistic paths, adapted to:

expand each path in said set of realistic paths on piece-wise polynomial basis to obtain an expanded representation of each said path, calculate a respective centroid function and a sequence of eigenfunctions for each said expanded representation, and calculate a set of principle paths representing the major variation of the set of paths, where the principle paths describe the variations of the set of realistic paths with respect to the centroid, and wherein the path model comprises a linear combination of principle paths.

In accordance with a second aspect, there is provided a method of defining a path model from a set of realistic paths, comprising the steps of:

expanding each path in the set of realistic paths on piece-wise polynomial basis to obtain an expanded representation of each path, calculating a respective centroid function and a sequence of eigenfunctions for each expanded representation, and calculating a set of principle paths representing the major variation of the set of paths, where the principle paths describe the variations of the set of realistic paths with respect to the centroid, and wherein the path model comprises a linear combination of principle paths.

In a development of the second aspect, the step of expanding each path into a linear combination of piece-wise polynomial basis functions comprises:

defining a first plurality of paths in terms of a second plurality of spline kernel locations and corresponding respective values gathering each said second plurality of spline kernel locations and corresponding respective values, as a single set of interpolation data.

In a further development of the second aspect, the step of expanding each path in the set of realistic paths on piece-wise polynomial basis to obtain an expanded representation of each path comprises solving the spline smoothing problem on the linear combination of piece-wise polynomial basis functions.

In a further development of the second aspect, the step of calculating a set of principle paths comprises the steps of:

finding a first principle path representing the major variation of the set of paths by determining the eigenfunction having the largest associated eigenvalue of the empirical covariance operator describing the set of paths, finding a further principle path representing the major variation of the set of paths by determining the eigenfunction having the largest associated eigenvalue of the empirical covariance operator describing the difference between the first principle path and each the path of the set of paths, and repeating the step of finding a further principle path recursively by determining for each further principle path the eigenfunction having the largest associated eigenvalue of the empirical covariance operator describing the difference between the preceding principle path and each path of the set of paths, until the principal paths together represent a predetermined fraction of the total variance of the set of paths.

In a further development of the second aspect, the predetermined fraction is between 85% and 99%.

In a further development of the second aspect, each step of determining the eigenfunction having the largest associated eigenvalue of the empirical covariance operator describing the set of paths comprises reducing the integral Fredholm equation describing the empirical variance of the projections of the set of paths onto the first primary path by expansion on a finite basis to an ordinary eigenvalue problem.

In a further development of the second aspect, the method comprises the further step of applying a clustering analysis to a pool of paths to select the paths constituting the set of paths.

In a further development of the second aspect, the clustering analysis uses a pyramidal clustering process.

In accordance with a third aspect, there is provided a method of displaying a set of paths, comprising the steps of defining a path model in accordance with the second aspect, displaying a respective modified path for each of the paths in the set of realistic paths whereby every point of a path is pairwise attracted to the centroid of the set of paths.

In a development of the third aspect, the pairwise attraction is based on a linear interpolation.

In accordance with a fourth aspect, there is provided a method of generating a set of realistic paths from a reference path defined by a first plurality of coefficients and a path model comprising one or more principle paths defined by a respective further the first plurality of coefficients, the method comprising the steps of:

multiplying each coefficient of the principle path by a respective random value, and adding the result to the corresponding vector of the reference path, to generate the decomposition coefficients of a new path.

In accordance with a development of the fourth aspect, the path model is generated in accordance with the second aspect.

In accordance with a further development of the fourth aspect, the reference path is the centroid.

In accordance with a fifth aspect, there is provided an apparatus adapted to implement the steps of any of the second, third or fourth aspects.

In accordance with a sixth aspect, there is provided a computer program adapted to implement the steps of any of any of the second, third or fourth aspects.

BRIEF DESCRIPTION OF THE DRAWINGS

The above and other advantages of the present invention will now be described with reference to the accompanying drawings, for illustration purposes only, in which:

FIG. 3a shows a first exemplary dataset for application of the method of FIG. 1;

FIG. 3b shows an application of the method of FIG. 1 to an exemplary data set of FIG. 3a;

FIG. 3c shows a further enriched version of the representation of FIG. 3b;

FIG. 4 shows a further development of the embodiment of FIG. 3;

DETAILED DESCRIPTION

A path can be subdivided as a linear combination of piecewise polynomial basis functions: given a cluster (i.e. a group) of paths, it is possible to compute a centroid function (i.e. centroid path) with its associated expansion coefficients. Any member of the cluster can be then written as a sum of the centroid and a complementary term expressed on the same piece-wise polynomial basis functions. The correspondence between a path and the expansion coefficients of the complementary term is one-to-one, allowing a simple generation of arbitrary paths. Furthermore, selection of the expansion basis from the eigenfunctions of the covariance operator allows generated paths to be statistically similar to the ones already pertaining to the cluster. This new path bundling technique provides a number of advantages, in particular:

- The created centroid function has a mathematic significance. It corresponds to the centre path of the corresponding cluster and thus can be considered as its bundled version.
- Since the centroid path is directly linked to each path in the cluster from which it is derived, one can modify this centroid and thus impact every path. This modification will not weaken the statistical properties of the cluster members. This new path generation feature may be referred to as an unbundling technique, or guided distortion, as discussed further below.

Figure 1:
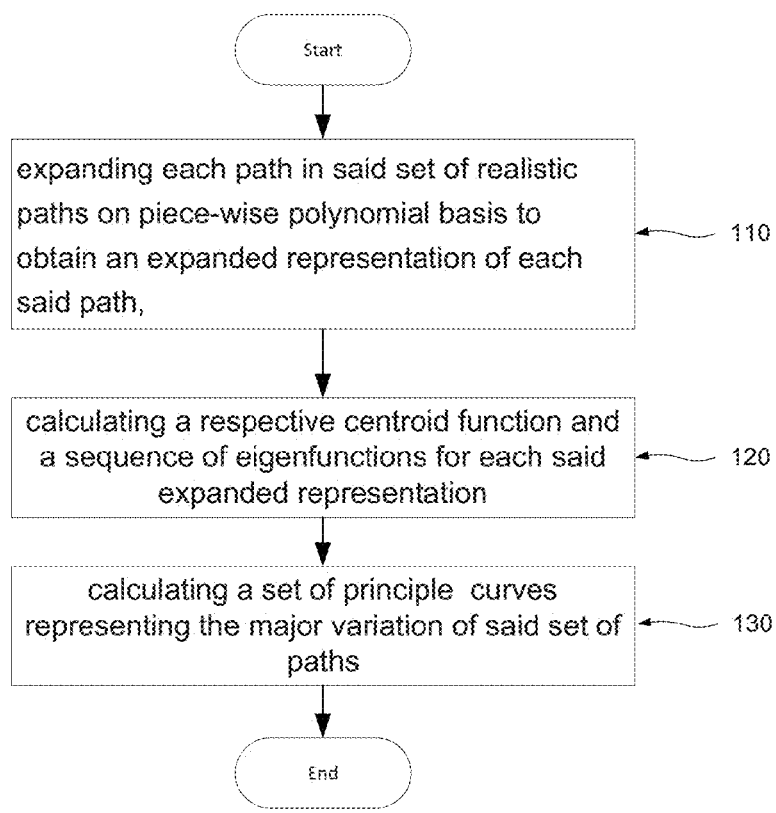
FIG. 1 shows the steps of a method of defining a path model from a set of realistic paths in accordance with an embodiment.

FIG. 1 shows the steps of a method of defining a path model from a set of realistic paths in accordance with an embodiment.

In many applications, paths are considered to constitute a basic element. Classical examples are spectroscopy, where one studies the relationship between wavelength and intensity and its statistical properties; time series; medical and social data. Despite the functional nature of the samples, standard multivariate statistics are generally used, leading to a loss of prior knowledge about the data and to an inefficient representation of the data.

The field of functional statistics is a quite recent and active area of research that aims at overcoming the limitations of standard methods when applied to paths or more generally to functions. It is based on the general idea that functions may be represented as points in a suitable space, in which the statistical features of the data may be easily expressed. A classical example is the computation of the centroid of a sample of paths $Y_1, \ldots, Y_N$ defined on a common interval $[0,1]$.

In multivariate statistics, observations come from a finite dimensional vector space E. Samples are modelled as random variables, which describe the possible outcomes and their probabilities of occurrence. It is further assumed that the observations are independent, that is, the knowledge of the value taken by one of them does not influence the outcome probabilities for the others and that the probability distribution is the same for all the random variables in a sample (the so-called IID assumption, for "independent, identically distributed"). Due to the fact that E admits a finite basis, a well defined Euclidean inner product is available and serves as a fundamental tool in many algorithms, especially those relying on a best approximation or minimal property. In clustering applications, it gives rise to a distance between samples and is of common use in mean-shift algorithms for defining the kernel, in hierarchical methods for closest pair identification and in k-means based clustering.

On the other hand, paths may exist in infinite dimensional spaces, for which inner products are not obvious to obtain. Even if one is defined, some very important properties like the existence of orthogonal projections are not guaranteed, which prevents the direct extension of multivariate algorithms in many cases. It is thus necessary to carefully select the space to which the paths will belong, and to ensure that it possesses all the required properties.

The foundation work presented in Ramsay, J. and Silverman, B. (2005). "*Functional Data Analysis*", Springer Series in Statistics, Springer, assumes that data originated from sample paths of stochastic processes with values in an Hilbert space H with a countable Hilbert basis of orthonormal vectors $e_i$, $i \geq 1$: a function $f$ from H may be obtained as the sum of a convergent series $f = \sum_{i=1}^{\infty} a_i e_i$, where the $a_i$, $i \geq 1$ are expansion coefficients that can be viewed as an infinite dimensional equivalent to coordinates of finite vectors. Standard choices for H include the usual space $L^2([a,b])$ defined to be the set of square integrable functions. When dealing with smooth paths, it is often useful to assume that all the derivatives up to a given order belong to $L^2([a,b])$. The corresponding sets of functions are known as Sobolev spaces. A common choice pertaining to this last case is:

$$W^2 = \{f \in C^1([0,1], \mathbb{R}) | f' \text{abs.cont.}, \int_0^1 f''(x)^2 + f''(x)^2 dx, +\infty\} \quad (1)$$

Given a function $\in W^2$, its norm is:

$$\|f\|_{W^2} \left( \int_0^1 f(x)^2 + f''(x)^2 dx \right)^{1/2} \quad (2)$$

The second derivative may not be defined for all values, since jumps may occur.

A significant feature of $W^2$ for visual representations is that the second derivative term gives access to curvature, so that curvature constraints may be taken into account directly.

In the expression of $\|f\|$, the term in $f^2$ may be viewed as the distance of f to 0, while the term $f''^2$ is related to roughness. For approximation problems, they play different roles, the former being linked with reconstruction error. Having a means to balance between accuracy and smoothness is valuable in certain applications. For example, where a user manually defines a line, it may be desirable apply smoothing by means of this characteristic. Accordingly a tuning parameter $\lambda \geq 0$ is often added:

$$\|f\|_{W^2} = (\int_0^1 f(x)^2 + \lambda f''(x)^2 dx)^{1/2} \quad (3)$$

Varying $\lambda$ allows to go smoothly from the usual $L^2([0,1])$ norm, to norms based on curvature only. Finally, functions from $W^2$ are often known only by their samples at given positions $t1, \ldots, tn$ in the interval $[0,1]$. The first term in the norm is then modified to take this into account, giving:

$$\|f\| = \left( \sum_{i=1}^{n} f^2(t_i) + \lambda \int_0^1 f''(x)^2 dx \right)^{1/2} \quad (4)$$

When dealing with planar or 3D paths, both coordinates are considered independent so that it is sufficient to consider only scalar valued functions defined on the closed interval $[0,1]$. Henceforth, all paths will be assumed to have coordinate functions in $W^2$.

On this basis, as shown in FIG. 1, there is provided a step 110 of expanding each path in a set of realistic paths on piece-wise polynomial basis to obtain an expanded representation of each path.

When dealing with paths described by sampled points (x1, ..., xn) at positions ($t_1$, ..., $t_n$), direct access to the underlying function is not possible. It is then relevant to seek a function in $\mathbb{W}^2$ with a minimal norm and that best approximates the data. Using a criterion based only on:

$$\int f''(x)^2 dx \qquad (5)$$

yields simpler results. Within this frame, the best approximating function θ can be written as:

$$\theta(t) = at + b + \sum_{i=1}^{n} \mu_i K(t, t_i) \qquad (6)$$

Where a, b, $\mu_1$, ... $\mu_n$ are computed so as to minimize a composite criterion:

$$e = \sum_{i=1}^{n} (\theta(t_i) - x_i)^2 + \lambda \int_0^1 \theta''(s)^2 ds \qquad (7)$$

Step 110 may comprise defining the plurality of paths in terms of a number of spline kernel locations and corresponding respective values, and gathering each the spline kernel locations and corresponding respective values as a single set of interpolation data.

In the expression (7), a value of λ>0 will adjust the balance of the criterion between reconstruction error and smoothness. When λ is close to 0, approximating paths will be bound to go as close as possible to the points ($x_1$, ..., $x_n$). Conversely, a large value of λ will give very smooth paths, close to straight segments, at the expense of a less accurate approximation.

K is a function of two real variables and is mathematically a reproducing kernel. It has the following properties:
K is symmetric: $\forall (t, s) \in [0,1]^2$, K(t, s)=K(s, t)
For all t in [0,1], K(t,0)=0 and DsK(t,0)=0 with:

$$D_s K(t, s) = \frac{\delta K}{\delta s}(t, s) \qquad (8)$$

K is reproducing. If $f$ is in $\mathbb{W}^2$ is such that $f(0) = f'(0)$, then:

$$f(t) = \int_0^1 \frac{\delta^2 K}{\delta s^2}(t, s) f''(s) ds \qquad (9)$$

The reproducing property (9) saves a lot of computations, since it equates an integral to a function evaluation. It can be used to obtain a closed form expression for K. Letting $(x)_+ = \max(0, x)$, K is expressed for s<t by:

$$K(t, s) = \frac{(t-s)_+^3}{6} - \frac{t^2 s}{2} - \frac{t^3}{6} \qquad (10)$$

K is known as the cubic spline kernel.

The step 110 of expanding each path in the set of realistic paths on piece-wise polynomial basis to obtain an expanded representation of each path may comprise solving a spline smoothing problem on the linear combination of piece-wise polynomial basis functions.

the optimal expansion (6) is called the smoothing cubic spline expansion. Due to the reproducing property, the optimal solution (6) can be computed using only standard linear algebra. Let G be the matrix:

$$G = \begin{pmatrix} 1 & t_1 & K(t_1, t_1) & \dots & K(t_1, t_n) \\ \vdots & \vdots & \vdots & \vdots & \vdots \\ 1 & t_n & K(t_{1n}, t_1) & \dots & K(t_n, t_{n1}) \end{pmatrix} \qquad (11)$$

And $\tilde{G}$ be:

$$\tilde{G} = \begin{pmatrix} 0 & 0 & \dots & \dots & 0 \\ 0 & 0 & \dots & \dots & 0 \\ 0 & 0 & K(t_1, t_1) & \dots & K(t_1, t_n) \\ \vdots & \vdots & \vdots & \vdots & \vdots \\ 0 & 0 & K(t_{1n}, t_1) & \dots & K(t_n, t_{n1}) \end{pmatrix} \qquad (12)$$

Let $\mu = (b, a, \mu_1, \dots \mu_n)$ be the vector of coefficients in (6) and X=($x_1$, ... $x_n$) the constraint points. The criterion (7) becomes:

$$\|X - G\mu\|^2 + \lambda \mu^t \tilde{G} \mu \qquad (13)$$

Taking the gradient with respect to μ and equating to 0 gives:

$$(G^t G + \lambda \tilde{G}) \mu = G^t X \qquad (14)$$

This is a linear system with positive definite matrix, easily solved using commonly available numerical libraries such as LAPACK.

Resampling Using Smoothing Splines

Observed paths have generally different numbers of samples and sampling locations. When using smoothing splines, this implies a per path specific expansion basis which is not compatible with statistical procedures that require a common expansion basis. The idea behind resampling is to fix the spline basis used in computation, then find the best approximation of paths on it. Assuming spline kernels are located at points ($t_1$, ..., $t_n$) in the interval [0,1], the optimal approximation is still be obtained with the linear system (14), using the modified matrices:

$$G = \begin{pmatrix} 1 & t_1 & K(t_1, \eta_1) & \dots & K(t_1, \eta_p) \\ \vdots & \vdots & \vdots & \vdots & \vdots \\ 1 & t_n & K(t_{1n}, \eta_1) & \dots & K(t_n, \eta_p) \end{pmatrix} \qquad (15)$$

and:

$$\tilde{G} = \begin{pmatrix} 0 & 0 & \dots & \dots & 0 \\ 0 & 0 & \dots & \dots & 0 \\ 0 & 0 & K(\eta_1, \eta_1) & \dots & K(\eta_1, \eta_n) \\ \vdots & \vdots & \vdots & \vdots & \vdots \\ 0 & 0 & K(\eta_{1n}, \eta_1) & \dots & K(\eta_n, \eta_{n1}) \end{pmatrix} \qquad (16)$$

The matrix $\tilde{G}$ may be computed once and for all. This is generally not the case for G, but on some problem instances, generation of all possible G can be carried out in advance, in which case finding expansion coefficients is significantly simplified. Finally, when considering planar or 3D paths, it may be necessary to obtain a matrix of coefficients, each column representing the vector of coefficients for the corresponding coordinate. Almost all linear system routines allow solving by means of matrices, making the overall process far more efficient than sequential solving.

Finding Path Distributions

A homogeneous cluster of paths $Y_1, \ldots, Y_N$, can be described by its mathematical expectation Y, which is the theoretical mean or centroid of the cluster members, and the distribution of the paths around it. Bundling and path generation will be performed using this information: reducing the discrepancy around Y will move the paths towards it, resulting in a bundling. On the other hand, randomly drawing according to the distributions around Y will generate new paths, statistically similar to the original sample. In practice, only estimators of Y and the path's distribution can be obtained, as described below.

Given a set of observed paths $Y_1, \ldots, Y_N$, it is assumed in the following discussion that they are sample paths of a stochastic process $\Gamma$ with values in $\mathbb{W}^2$. Since this assumption is valid only if all the paths are sufficiently similar one to another, a pre-processing clustering is implicit in this example. As explained above, the mathematical expectation of $\Gamma$ is the theoretical centroid $Y=E[\Gamma]$ of the cluster. In applications, individual paths $Y_1, Y_N$ are known only by their values $x_{ij}=Y_i(t_{ij})$, $j=1 \ldots n_i$ at positions $t_{ij}$, and estimators of Y can only be based on this information.

When paths are sampled at the same positions, namely $t_{ij}=s_j$, $i=1 \ldots N, j=1 \ldots n$, is quite natural to use the so-called empirical estimator:

$$\hat{\gamma}(s_j) = N^{-1} \sum_{i=1}^{N} x_{ij} \quad (17)$$

Equivalently, the spline expansions of the path and the empirical mean of the coefficients may be calculated as described in Ramsay, J. and Silverman, B. (2005). Functional Data Analysis. Springer Series in Statistics. Springer. When the sampling positions $t_{ij}$ are uneven and depend on the path, it is no longer possible to use the empirical estimator. An asymptotically optimal procedure has been introduced in Yao, F., Müller, H.-G., and Wang, J.-L. (2005). Functional linear regression analysis for longitudinal data. Ann. Statist., 33(6):2873-2903. This approach consists of gathering all the samples $x_{ij}$ and positions $t_{ij}$ as a single set of interpolation data, then solving the spline smoothing problem on it. It is equivalent to the empirical estimator on spline expansions coefficients for evenly space sampling positions but yields better results in a general situation.

It is assumed that the mean path $\hat{\gamma}$ was obtained from the cluster $Y_1, \ldots, Y_N$. The next step is the determination of a suitable notion of statistical discrepancy around $\hat{\gamma}$. Since the space of sample paths is the infinite dimensional $\mathbb{W}^2$, a probability density cannot be defined on it. However, after expansion of the paths on a truncated Hilbert basis, fitting a distribution on the vectors of coefficients becomes possible. At a first glance, just using the spline basis will perform the task, but this approach suffers two drawbacks:

While being asymptotically optimal, there is no reason for the spline expansion to be the best possible choice when using only a fixed number of coefficients.

Expansion coefficients are correlated, so that it is not possible to control what happens when only one is changed. For visual analytics applications, this can make the whole procedure useless, as the user cannot determine the net effect of his actions.

In the next section, the concept of the principal path will be introduced solve both issues at the same time.

As shown in FIG. 1, there is provided a step 120, following step 110, of calculating a respective centroid function and a sequence of eigenfunctions for each expanded representation obtained at step 110.

Principal Paths

The principal paths for a sample are functions that best describe the variations around the centroid. They can be used as a new Hilbert basis, with quite unique features:

The expansion coefficients are uncorrelated.

The truncated expansions are optimal in the sense that they represent as much of the variance of the sample as possible.

The principle underlying it can be summarized in a quite intuitive way. Considering a sample $(Y_1, \ldots Y_N)$ of independent centred paths (i.e. with zero mathematical expectation), it is desirable to find a path $\sigma_0$ that represents the major variation of the sample. From a mathematical standpoint, it can be formulated as maximizing:

$$\frac{1}{N} \sum_{i=1}^{N} \int_0^1 \gamma_i(s)\sigma_0(s)ds \quad (18)$$

Under the constraint:

$$\int_0^1 \sigma_0^2(S)ds = 1 \quad (19)$$

The criterion (18) is in fact the empirical variance of the projections of the paths $Y_i$, $i=1 \ldots N$ onto the reference $\sigma_0$ and the condition (19) is added to make the problem non degenerate.

Writing down the first order condition for optimality, one obtains the relation:

$$\forall \in [0,1], \int_0^1 \left( \frac{1}{N} \sum_{i=1}^{N} \gamma_i(t)\gamma_i(s) \right) \sigma_0(s)ds = \lambda \sigma_0(t) \quad (20)$$

This shows that $\sigma_o$ has to be an eigenfunction of the empirical covariance operator:

$$f \in \mathbb{W}^2 \to \int_0^1 \left( \frac{1}{N} \sum_{i=1}^{N} \gamma_i(t)\gamma_i(s) \right) f(s)ds \quad (21)$$

As such, and as shown in FIG. 1, there is provided a step 130 following step 120, of calculating a set of principle paths representing the major variation of the set of paths.

It is clear that, in order to maximize the value of the criterion (18), one must select the eigenfunction with largest associated eigenvalue $\lambda_0$. One can then recursively apply the procedure on the paths $Y_i - \lambda_0 \sigma_0$ to obtain an orthogonal basis $\sigma_0, \sigma_1, \ldots$ that ensures the best possible decrease in variance at each stage. It can be proved also that the expansion coefficients on this basis are uncorrelated. The paths $\sigma_i$, $i \geq 0$ are known as the principal paths of the sample. It is an extension of the usual multivariate PCA to a functional setting.

Accordingly, step 130 may comprise the further steps of finding a first principle path representing the major variation of the set of paths by:

- determining the eigenfunction having the largest associated eigenvalue of the empirical covariance operator describing the set of paths,
- finding a further principle path representing the major variation of the set of paths by determining the eigenfunction having the largest associated eigenvalue of the empirical covariance operator describing the difference between the first principle path and each path of said the of paths, and
- repeating the step of finding a further principle path recursively by determining for each further principle path the eigenfunction having the largest associated eigenvalue of the empirical covariance operator describing the difference between the preceding principle path and each path of the set of paths, until the principal paths together represent a predetermined fraction of the total variance of the set of paths.

The predetermined fraction of total variance may be any value appropriate to user requirements. Typical values may lie between 85% and 99%.

Numerical Implementation

FPCA involves finding the first eigenfunctions of an operator. It is a well-studied problem, known as a Fredholm equation of the second kind.

Accordingly, each step of determining the eigenfunction having the largest associated eigenvalue of the empirical covariance operator describing the set of paths may comprise reducing the integral Fredholm equation describing the empirical variance of the projections of the set of paths onto the first primary path by expansion on a finite basis to an ordinary eigenvalue problem.

A numerical solution is generally obtained using a discrete approximation of the integral, thanks to a quadrature formula that turns the original problem into finding the eigenvalues and eigenvectors of a matrix, as described by Nyström, E. J. Über die praktische auflösung von integralgleichungen mit anwendungen auf randwertaufgaben. *Acta Mathematica*, 54(1):185-204.

Thus the step of expanding the first plurality of paths to obtain a matrix of covariance defining the plurality of paths may comprise expanding the first plurality of paths by means of a Nyström approximation.

In the special instance of the problem arising in the context of the present invention, it may be desirable to use the expansion coefficients of the paths on the spline basis in order to avoid extra computations.

The derivation of the algorithm for finding principal paths can be made using several steps detailed below. It is presented for a arbitrary truncated Hilbert basis $\phi_1, \ldots, \phi_n$, but will be instantiated to the spline basis when applied. Instead of considering finite sums for the functions expansions a more compact vector notation will be used. For any $t \in [0,1]$, $F(t)$ is the vector $\phi_1(t), \ldots, \phi_n(t)$. If the function $f$ is expanded as $f(t) = \sum_{j=1}^{n} a_j \phi_j(t)$, then it can written as $f(t) = a^t \Phi(t) = \Phi^t(t)a$ with $a = (a_1, \ldots, a_n)$. Starting with the sample $Y_1, \ldots, Y_N$, let $a_1, \ldots, a_n$ be its respective vectors of coefficients, i.e. each $a_i$ is an n-dimensional vector with elements the $a_{ij}$ such that $\gamma_i(t) = \sum_{j=1}^{n} a_{ij}\phi_j(t)$. The empirical covariance of the sample can be expressed in a vector form as:

$$C(t,s) = \frac{1}{N}\sum_{i=1}^{N} \gamma_i(t)\gamma_i(s) = \Phi^t(t)C_a\Phi_s \quad (22)$$

With:

$$C_a = \frac{1}{N}\sum_{i=1}^{N} a_{ij}a_{ik} \quad (23)$$

which represents the covariance matrix of the expansion coefficients. Assuming the principal path $\sigma$ has coefficients vector b, the Fredholm integral equation (20) can be rewritten as:

$$\Phi^t(t)C_aC_\Phi \int_0^1 \Phi(s)\Phi^t(s)dsb = \lambda \Phi^t(t)b \quad (24)$$

Letting $$C_\Phi = \int_0^1 \Phi(s)\Phi^t(s)ds \quad (25)$$

It becomes:

$$\Phi^t(t)C_aC_\Phi b = \lambda \Phi^t(t)b \quad (26)$$

It can be proved that $C_\Phi$ is positive definite matrix under mild assumptions, satisfied for the spline basis. Since the equation (26) is valid for any $t \in [0,1]$, it becomes:

$$\int_0^1 \Phi(t)\Phi^t(t)dt C_aC_\Phi b = \lambda \int_0^1 \Phi(t)\Phi^t(t)dt b \quad (27)$$

Or in matrix form:

$$(C_\Phi C_a C\Phi)b = \lambda C_\Phi b \quad (28)$$

This is a standard eigenvalue/eigenvector problem, the solution of which will give $C_\Phi b$ and $\lambda$ (in fact, all the n eigenvectors may be computed, yielding the first n principal paths).

As such, the eigenvalue problem may be solved for each eigenfunction, in order to identify the largest eigenvalue by the step of expanding the first plurality of paths to obtain a matrix of covariance defining the plurality of paths comprises expanding the first plurality of paths on a common truncated Hilbert basis.

The vectors b are then readily obtained by solving a linear system with matrix $C_\Phi$. The matrix $C_\Phi$ can be computed once and for all, as it depends only on the spline kernel's locations. It allows a further optimization by computing its Cholesky decomposition $C_\Phi = L^t L$ with L representing the lower triangular and admitting an inverse. The equation (28) becomes:

$$L^tLC_aL^tLb = \lambda L^tLb \quad (29)$$

Which, since $L^t$ can be inverted, is equivalent to:

$$LC_aL^tLb = \lambda Lb \quad (30)$$

which is solved for Lb. The major improvement upon the form (28) is that finding b from Lb can be performed by back-substitution, which has lower complexity than standard linear system solving.

Alternatively, the eigenvalue problem may be solved for each eigenfunction, in order to identify the largest eigenvalue by means of QR with shift or Jacobi iteration.

Clustering

In real data sets, it may be necessary to isolate a cluster of related paths from a large number of paths, in order to constitute the set of paths to which the method of FIG. 1 is to be applied. Path proximity as described by Ersoy, O., Hurter, C., Paulovich, F., Cantareiro, G., and Telea, A. (2011) in Skeleton-Based Path Bundling for Graph Visualization. *IEEE Transactions* may be used, or the paths may be clustered according to variance. Still further, a pyramidal clustering process may be used, comprising the steps of:

defining as many cluster as the number of paths, selecting the first cluster (which contains only one path) and finding the closest cluster in terms of proximity (Euclidean distance) and likelihood (variance computation), merging the two closest clusters and computing an average item in terms of proximity (median) and likelihood (variance computation), Repeating with the next cluster, until the closest two clusters have a distance (Euclidean and variance) beyond a predefined threshold.

This clustering process is computationally challenging and may be accelerated by use of a standard quad tree to only investigate neighbouring paths.

The method of FIG. 1 relates to a method of defining a path model from a set of realistic paths. Once a path model of this kind is available, it may be used as a convenient representation of the set of realistic paths.

The centroid function can be used as a magnet to bundle paths and thus gather them to clarify the view. It can also be distorted and thanks to the one-to-one correspondence mentioned above, a new set of paths can be generated.

In some cases merely the centroid itself may be displayed. In other cases, it may be desirable to also present the original paths in addition to or instead of the centroid, but in a modified form influenced by the path model. For example after the clustering process, the Functional Decomposition of each cluster can be applied. In order to display the bundled version of a given cluster, a magnetic attraction model may be applied in which every point of a path will be pairwise attracted to the cluster centroid. This computation is based on a linear interpolation (e.g. relaxation factor). In order to avoid sharp kinks, a margin parameter may be applied.

Figure 2:
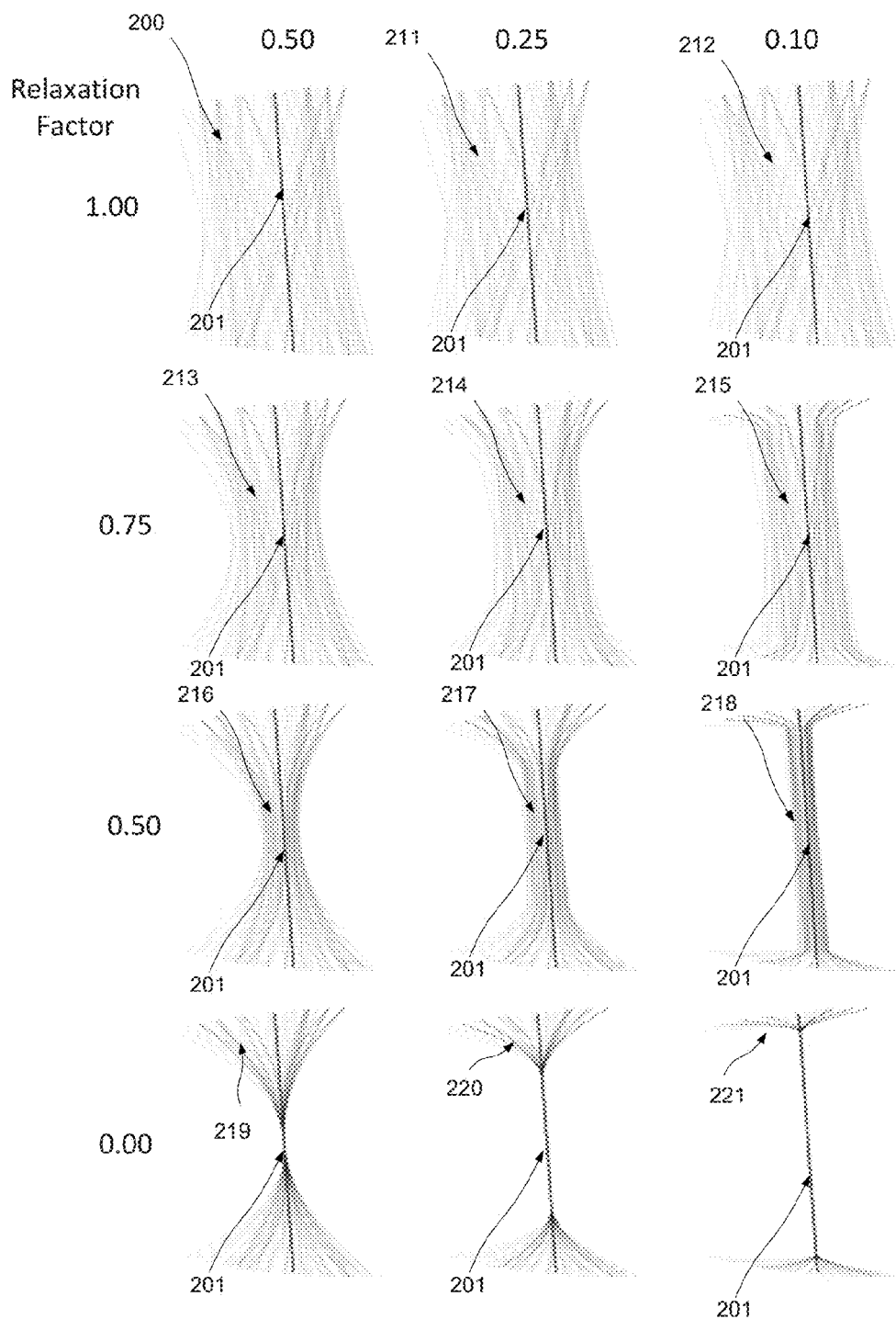
FIG. 2 illustrates the effects of different Relaxation factor values and Margin values on the displayed data.

FIG. 2 illustrates the effects of different Relaxation factor values and Margin values on the displayed data.

Specifically, as shown in FIG. 2, a centroid 201 reflecting a set of paths 200 is plotted, along with a modified version of the original set of paths 200. Modified path set 211 corresponds to path set 200 re-plotted with a margin value of 0.25 and a Relaxation factor of 1. Modified path set 212 corresponds to path set 200 re-plotted with a margin value of 0.10 and a Relaxation factor of 1. Modified path set 213 corresponds to path set 200 re-plotted with a margin value of 0.5 and a Relaxation factor of 0.75.

Modified path set 214 corresponds to path set 200 re-plotted with a margin value of 0.25 and a Relaxation factor of 0.75. Modified path set 215 corresponds to path set 200 re-plotted with a margin value of 0.10 and a Relaxation factor of 0.75. Modified path set 216 corresponds to path set 200 re-plotted with a margin value of 0.50 and a Relaxation factor of 0.5. Modified path set 217 corresponds to path set 200 re-plotted with a margin value of 0.25 0 and a Relaxation factor of 0.5. Modified path set 218 corresponds to path set 200 re-plotted with a margin value of 0.10 and a Relaxation factor of 0.5. Modified path set 219 corresponds to path set 200 re-plotted with a margin value of 0.50 and a Relaxation factor of 0.00. Modified path set 220 corresponds to path set 200 re-plotted with a margin value of 0.25 and a Relaxation factor of 0.00. Modified path set 221 corresponds to path set 200 re-plotted with a margin value of 0.10 and a Relaxation factor of 0.00.

FIG. 3a shows a first exemplary dataset for application of the method of FIG. 1. FIG. 3a shows raw Air France® Flight path data in a two dimensional projection corresponding to the underlying geography (not shown).

Aircraft follow flight routes that are composed of an ordered sequence of spatio-temporal references (beacons). Aircraft usually follow flight routes but can deviate from them for safety or traffic optimization reasons. These routes are complex to define and can have a large impact on fight duration, fuel consumption and traffic complexity. These routes can change over time. The main goal of these modifications is to optimize traffic flow (more aircrafts can be managed) with a higher safety and an improvement of the traffic fluidity. Every change can impact the global system and are highly complex to forecast.

This data-set represents one day of recorded aircraft trajectories over France and is composed of multiple lines, or piece-wise segments defined by 232 clusters and 50 000 points. A close up of one region of the data set illustrates how each flight is represented by an individual path.

FIG. 3b shows an application of the method of FIG. 1 to an exemplary data set of FIG. 3a. Here a relaxation and margin, selected on aesthetic criteria, have been applied and the original data replotted without the centroid value, in accordance with the approach described with reference to FIG. 2. As can be seen in FIG. 3b, the projection is significantly clearer, since the numerous individual flights have been gathered into bundles by the operation of the invention. This is particularly visible in the close up region, in which a number of paths 301 have been gathered together in a bundle 302.

In addition to simplifying the display of the complex datasets as illustrated in FIGS. 3a and 3b, the bundled representation of FIG. 3b also provides an excellent basis for further enriching the display.

FIG. 3c shows a further enriched version of the representation of FIG. 3b. As shown in FIG. 2c, the same bundles 302 described with reference to FIG. 3b are represented, however the representation of each bundle has been further modified to reflect statistical information obtained during the processing in accordance with the method of FIG. 1. Specifically as shown, the width of each bundle is set to represent density as described by Vsevolod Peysakhovich, Christophe Hurter, A. T. (2015) in Attribute-Driven Path Bundling for General Graphs with Applications in Trail Analysis, *PacificVis*. Similarly, a distance transform may be computed to emphasize the border path of a bundle by defining the colour of each bundle, according its distance to the cluster centre line as described by Telea, A. and Ersoy, O. (2010). Image-based path Bundles: Simplified Visualization of Large Graphs. In *Proceedings of the 12th Eurographics/IEEE—VGTC Conference on Visualization*, EuroVis'10, pages 843-852, Chichester, UK. The Eurographs Association & John Wiley & Sons, Ltd.

FIG. 4 shows a further development of the embodiment of FIG. 3.

In FIG. 4, a specific section of a flight route between Nice (South East of France) and Paris (Centre of France), which may be a sub-set of the representation of FIG. 3, is shown in greater detail. FIG. 4 presents three dimensional views of the data, with view 410 and 480 being top views, 430, 440, 450, 460 being side views, and views 420 and 470 being projections from angles intermediate to the side and top views. In each view, a respective centroid 411, 421, 431, 441, 451, 461, 471 and 481 is shown as a thicker dotted line. As such, views 410, 420, 430, 440, 450, 460, 470 and 480 may represent an ordered sequence of views corresponding to a specific series of user interactions. The side views show ascending and then descending trajectories, a user wishing to assess the fuel consumption of aircraft if the ascending and descending sequence is reduced to a lower altitude. Views 410, 420, 430 show the given cluster between the top view (latitude and longitude) and the vertical view (aircraft altitude is visible). View 440 illustrates the use by a user of an interface feature allowing the manual modification of the centroid. Thanks to a centreline modification tool, the user draws a path with the mouse pointer and will attract the centre line 441 towards a new position 442. This may be repeated indefinitely until a desired shape is achieved. The user might of course simply draw the required centroid from scratch, recover a stored shape, and so on. Once the new centroid 451 is defined as shown in view 450, an unbundling process may then be applied. In view 460 new trajectories 462 are unbundled from the centroid path 461. The user can visually inspect the resulting trajectories as shown in views 470, 480. As a final stage, the unbundled trajectories can be extracted to compute new fuel consumption and thus assess the impact of such modification on the flight routes between Nice and Paris.

By way of example, a complete pseudo-code implementing the method of FIG. 1 is presented below. It is assumed that paths have been gathered into clusters as described above.

K is the spline kernel and Cholesky stands for an external Cholesky factorization procedure. All returned values are assumed to be scalars.

The routine GetPrincipalPaths yields a matrix that gives row by row the spine expansion coefficients of the principal paths. It may be further used in conjunction with the vector v of eigenvalues for path generation as indicated below.

Finally, the computation of a point on a path at location t can be done readily with the expansion coefficients.

---

Algorithm 1 Spline expansions and principal paths

---

```
 1: procedure GETCPHIMATRIX(L, t) ▶ Outputs in L the Cholesky factor of the CPhi matrix. t is an array of spline kernel locations
 2:     n←length(t)
 3:     for i = 1,n do
 4:         L(i, j)←∫₀¹ K(tᵢ, s) * K(tⱼ, s)ds ▶ Integral admits a close form expression
 5:     end for
 6:     Cholesky(L) ▶ Lower triangle of M is overwritten by the cholesky factor
 7: end procedure
 8: procedure GETPATHEXPANSION(a,X, s, t) ▶ a is the returned coefficients array, X is the matrix of path points with coordinates in columns, s holds the sample positions, t is the array of kernel locations
 9:     n←length(s)
10:     m←length(t)
11:     for i = 1,n do
12:         G(i,1)←1
13:         G(i,2)←s(i)
14:         for j = 1,m do
15:             G(i, j+2)←K(s(i), t(j))
16:         end for
17:     end for
18:     for i = 1,m do
19:         for j = 1,m do
20:             G0(i, j)←K(t(i), t(j))
21:         end for
22:     end for
23:     M ←Gt *G+lG0 ▶ l is the smoothing parameter described above
24:     a←M-1 *Gt *X ▶ Matrix inverse is not computed: a linear system solving procedure is used instead
25: end procedure
26: procedure GETCOEFFSCOVARIANCE(C,A) ▶ Returns the covariance matrix of spline coefficients in C. A is a matrix whose rows are coefficient vectors for all paths
27:     (n,m)←size(A) ▶ n is the number of rows, m the number of columns
28:     C←n-1AᵗA
29: end procedure
30: procedure GETPRINCIPALPATHS(P, v,A, t) ▶ P is the returned matrix of principal paths coefficients (in rows), v is the returned vector of eigenvalues, A is the matrix of paths coefficients (in row), t is the array of kernel locations
31:     n←length(t)
32:     GetCoeffsCovariance(Ca,A)
33:     GetCPhiMatrix(L, t)
34:     M ←L *Ca *Lt
35:     eigen(M,P,v) ▶ eigen is a generic computation routine that returns the eigenvectors of M in P and the eigenvalues in v
36:     P←L-1P
37: end procedure
```

Path Generation

A careful choice of the expansion basis allows generated paths to be statistically similar to the ones already pertaining to the cluster. Specifically, from the previous computations, one can obtain a set of n principal paths described by their coefficient vectors that will be denoted as $b_1, \ldots, b_n$ in the following discussion. Due to standard properties of Karhunen-Loeve expansions, these vectors are uncorrelated, thus independent if they are assumed normally distributed. Generating new paths statistically similar to the initial sample can be done just by finding the density of the vectors $b_1, \ldots, b_n$, then drawing new coefficients vectors from it. Non-parametric kernel estimators, or a direct estimation of variance may be used for this purpose, as it is obtained readily from the eigenvalues $\lambda$ obtained when solving the problem (30). To generate a new path with the same distribution as the sample, the procedure is fairly simple:

Draw n random real numbers $c_1, \ldots, c_n$ according to independent, centered normal distributions with variances the eigenvalues obtained when solving (30), Get the new function as:

$$\tilde{\gamma}(t) = \hat{\gamma}(t) + \sum_{j=1}^{N} c_j \phi_j(t) \qquad (31)$$

The cluster centroid may be replaced by any path from $\mathbb{W}^2$, giving the ability to generate random paths around an arbitrary medial line.

The algorithm may also be used without any random generation: the original expansion coefficients of paths from the cluster may be used to reproduce a similar trajectory, but around a different centroid. This process may be referred to as unbundling. Any centroid (e.g. one modified or defined by the user) can be used to generate a set of paths with the same statistical properties. Furthermore, varying the coefficients from 0 to their final value will change the amount of unbundling applied, letting the user interact with the generated paths.

Accordingly, there is provided a method of generating a set of realistic paths from a reference path defined by a first plurality of coefficients and a path model, such as generated in accordance with the method of FIG. 1, comprising one or more principle paths defined by a respective further first plurality of coefficients, the method comprising the steps of multiplying each coefficient of the principle path by a respective random value, and adding the result to the corresponding vector of the reference path, which may be the centroid, to generate the decomposition coefficients of a new path.

Each random value may be obtained from a respective independent, centred normal distribution with variance equal to the eigenvalue of the corresponding principle path.

By way of example, a complete pseudo-code implementing this process is provided below.

K is the spline kernel and Cholesky stands for an external Cholesky factorization procedure. Please note that all returned values are assumed to be scalars, the extension to 2D or 3D points is immediate as coordinates are assumed independent (Algorithm 3).

| Algorithm 2 Generation of random paths |
|---|
| 1: procedure GETNEWPATH(a,b,P, v) ▶ P, v have the same meaning as in the GetPrincipalPaths procedure. b is the vector of coefficients for the cluster centroid. a is the returned vector of coefficients for the newly generated path<br>2:    n←length(b)<br>3:    for i=1,n do<br>4:        a(i)←b(i)+SQRT(v(i)) *P(i, :) * randn(n) ▶ randn(n) draws a vector of length n from a normal distribution.<br>5:    end for<br>6: end procedure |

The generation of paths in this manner is of great interest in a number of fields. For example in computer games, computer simulations and the like, it is often necessary to generate the paths of vehicles, people, animals, missiles, bullets, particles and many other entities. The present invention opens the possibility of generating a large number of paths from a single representative path model, such that each generated path is realistic and reflects the characteristics of an authentic path. Other examples of applications include the generation of fur or hair, flow visualization, or Stochastic path optimization algorithms.

Algorithm 2 produces a functional decomposition. Further steps, for example as set out in Algorithm 3 below, are required to compute a point on a path at a given time from the spline expansion parameters.

| Algorithm 3 Path evaluation |
|---|
| 1: procedure GETPATHPOINT(x, t,a, s)) ◁ x is the returned point, t is the location of the point, a is the vector of coefficients, s is the vector of spline kernels locations<br>2:    n←length(s)<br>3:    for i=1,n do<br>4:        v(i)←K(t, s(i))<br>5:    end for<br>6:    x←vt * a<br>7: end procedure |

The preceding procedures are applicable to data sets having any number of dimensions dataset and nothing prevents to extend this algorithm to more than 2 dimensions. For example, the flight path data described with respect to FIG. 3 might comprise altitude information, in which case the paths generated might correspondingly be three-dimensional.

Accordingly, there is defined a method of defining a path model from a set of realistic paths is provided, where each path in the set of realistic paths is expanded on piece-wise polynomial basis, and a respective centroid function and sequence of eigenfunctions calculated for each expanded representation. A set of principle paths representing the major variation of this set of paths is obtained describing the variations of the set of realistic paths with respect to the centroid. The path model thus comprises a linear combination of principle paths. The path model may be used as the basis for the generation of new curves having similar characteristics to the original set of realistic paths.

The disclosed methods can take form of an entirely hardware embodiment (e.g. FPGA), an entirely software embodiment (for example to control a system according to the invention) or an embodiment containing both hardware and software elements. As such, embodiments may comprise a number of subsystems, functional elements or means adapted to implement the invention in communication with each other, and/or with standard fixed function or programmable elements for example as described below.

On this basis, there is provided an apparatus for defining a path model from a set of realistic paths, said apparatus adapted to: expand each path in the set of realistic paths on piece-wise polynomial basis to obtain an expanded representation of each path, calculate a respective centroid function and a sequence of eigenfunctions for each said expanded representation, and calculate a set of principle paths representing the major variation of the set of paths, where the principle paths describe the variations of the set of realistic paths with respect to the centroid, and wherein the path model comprises a linear combination of the principle paths.

Similarly, there is provided an apparatus adapted to perform the steps of any of the methods described above, for example with respect to FIG. 1, or any of the algorithms detailed above.

Software embodiments include but are not limited to applications, firmware, resident software, microcode, etc. The invention can take the form of a computer program product accessible from a computer-usable or computer-readable medium providing program code for use by or in connection with a computer or an instruction execution system.

A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device, including IoT (Internet Of Things) devices.

Figure 5:
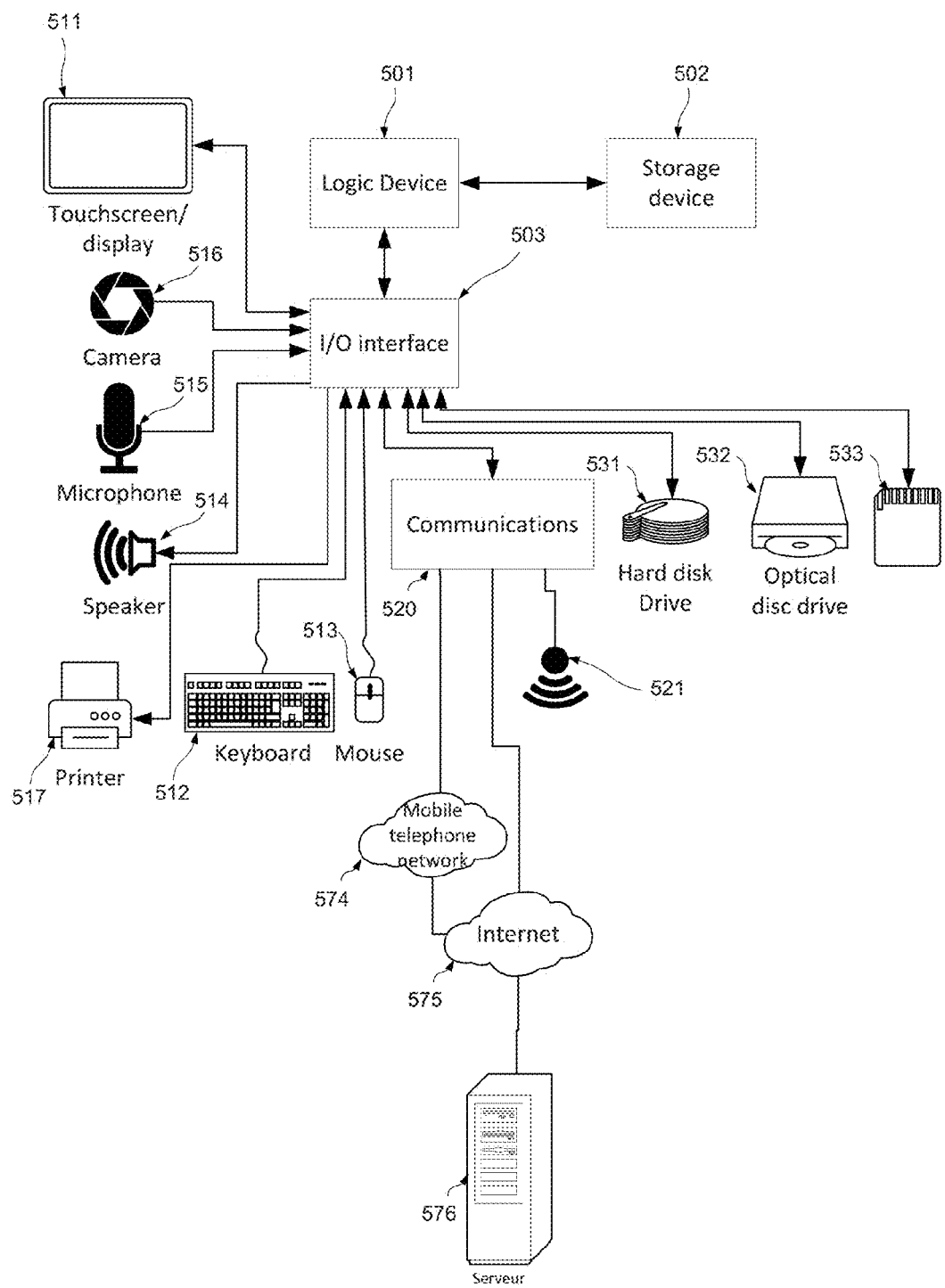
FIG. 5 shows a generic computing system suitable for implementation of embodiments of the invention.

FIG. 5 shows a generic computing system suitable for implementation of embodiments of the invention.

A shown in FIG. 5, a system includes a logic device 501 and a storage device 502. The system may optionally include a display subsystem 511, input/output subsystem 503, communication subsystem 520, and/or other components not shown.

Logic device 501 includes one or more physical devices configured to execute instructions. For example, the logic device 501 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 501 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 501 optionally may be distributed among two or more separate devices, which may be remotely located and/or configured for coordinated processing. Aspects of the logic device 1001 may be virtualized and executed by remotely accessible, networked computing devices configured in a cloud-computing configuration.

Storage device 502 includes one or more physical devices configured to hold instructions executable by the logic device to implement the methods and processes described herein. When such methods and processes are implemented, the state of storage 502 device may be transformed—e.g., to hold different data.

Storage device 502 may include removable and/or built-in devices. Storage device may be locally or remotely stored (in a cloud for instance). Storage device 502 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface 503 adapted to support communications between the Logic device 501 and further system components. For example, additional system components may comprise removable and/or built-in extended storage devices. Extended storage devices may comprise one or more types of storage device including optical memory 532 (e.g., CD, DVD, HD-DVD, Blu-Ray Disc, etc.), semiconductor memory (not shown) (e.g., RAM, EPROM, EEPROM, FLASH etc.), and/or magnetic memory 531 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 501 and storage device 502 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device 502. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 5 may be used to implement embodiments of the invention.

For example a program implementing the steps described with respect to FIG. 1, or the algorithms presented above may be stored in storage device 502 and executed by logic device 501. Original path data may be stored in storage 502 or the extended storage devices 532 or 531 and the display 511 used to display a graphical representation of the paths.

Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 511 may be used to present a visual representation of data held by a storage device. This visual representation may take the form of a graphical user interface (GUI). As the herein described methods and processes change the data held by the storage device 502, and thus transform the state of the storage device 502, the state of display subsystem 511 may likewise be transformed to visually represent changes in the underlying data. Display subsystem 511 may include one or more display devices utilizing virtually any type of technology for example as discussed above. Such display devices may be combined with logic device and/or storage device in a shared enclosure, or such display devices may be peripheral display devices.

When included, input subsystem may comprise or interface with one or more user-input devices such as a keyboard 512, mouse 513, touch screen 511, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 520 may be configured to communicatively couple computing system with one or more other computing devices. For example, communication module of communicatively couple computing device to remote service hosted for example on a remote server 1076 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 574, or a wired or wireless local- or wide-area network. In some embodiments, the communication subsystem may allow computing system to send and/or receive messages to and/or from other devices via a network such as Internet 575. The communications subsystem may additionally support short range inductive communications with passive or active devices (NFC, RFID, UHF, etc).

Figure 6:
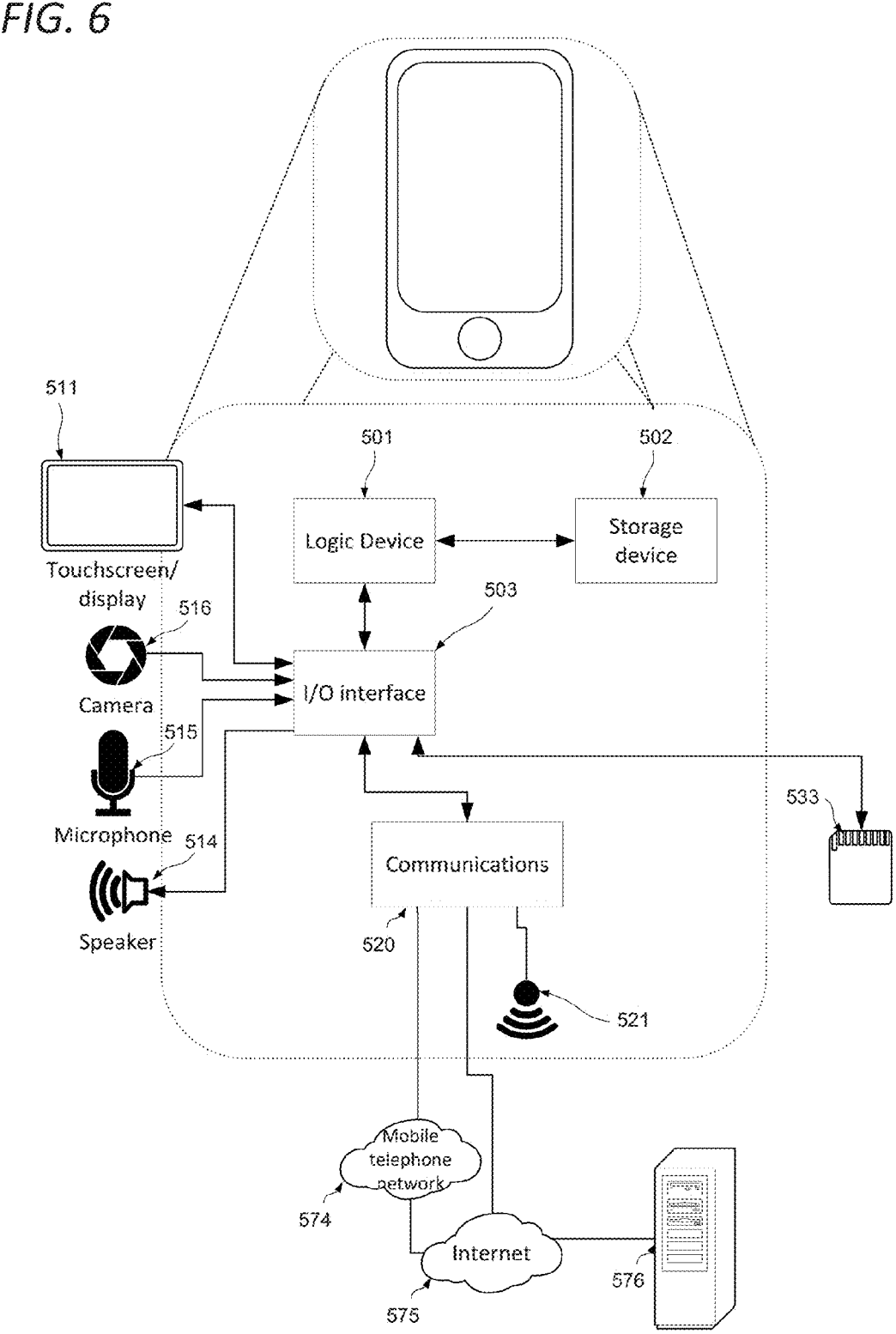
FIG. 6 shows a smartphone device adaptable to constitute an embodiment.

The system of FIG. 5 is intended to reflect a broad range of different types of information handling system. It will be appreciated that many of the subsystems and features described with respect to FIG. 5 are not required for implementation of the invention, but are included to reflect possible systems in accordance with the present invention. It will be appreciated that system architectures vary widely, and the relationship between the different sub-systems of FIG. 5 is merely schematic, and is likely to vary in terms of layout and the distribution of roles in systems. It will be appreciated that, in practice, systems are likely to incorporate different subsets of the various features and subsystems described with respect to FIG. 5. FIGS. 5 and 6 disclose further example devices in accordance with the present invention. Those of ordinary skill in the art will appreciate that systems may be employed in the future which also operate in accordance with the present invention.

FIG. 6 shows a smartphone device adaptable to constitute an embodiment. As shown in FIG. 6, the smartphone device incorporates elements 501, 502, 503, 520, optional near field communications interface 521, flash memory 533 and elements 514, 515, 516 and 511 as described above. It is in communication with the telephone network 575 and a server 576 via the network 575. Alternative communication mechanisms such as a dedicated network or Wi-Fi may also be used. The features disclosed in this figure may also be included within a tablet device as well.

Figure 7:
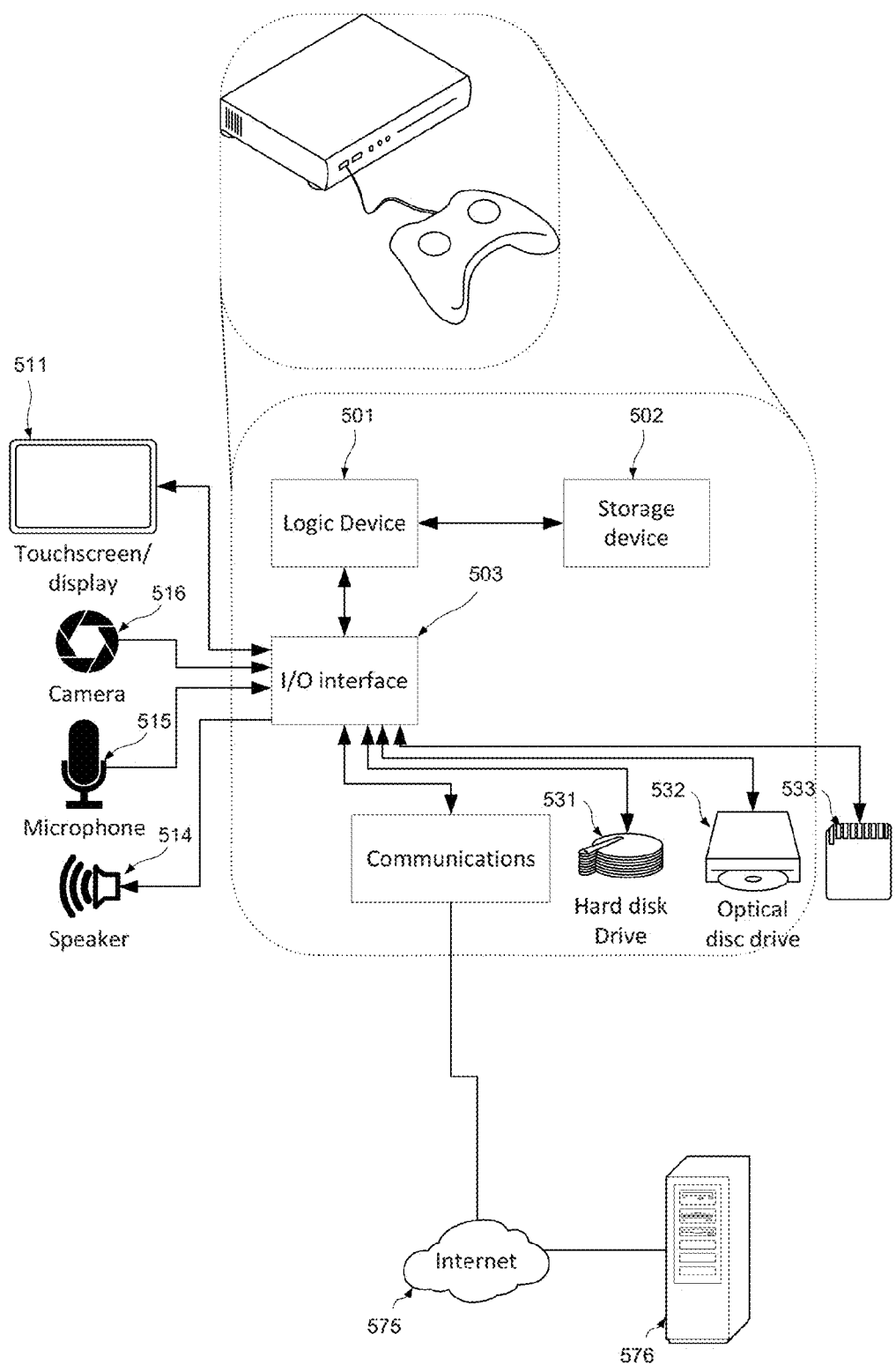
FIG. 7 shows a games console adaptable to constitute an embodiment.

FIG. 7 shows a games console adaptable to constitute an embodiment. As shown in FIG. 7, games console comprises elements 501, 502, 503, 520, 514, 515, 516, 511, 531, 532, 533 as described above. It may be in communication with a server 576 via the network 575. Alternative communication mechanisms such as a dedicated network or Wi-Fi may also be used.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An apparatus for displaying a modified path based on a path model obtained by expanding each path in a set of realistic paths on piece-wise polynomial basis to obtain an expanded representation of each said path, calculating a respective centroid function and a sequence of eigenfunctions for each said expanded representation, and calculating a set of principle paths representing a major variation of said set of realistic paths, where said principle paths describe variations of said set of realistic paths with respect to the respective said centroid function, and wherein said path model comprises a linear combination of said principle paths, said apparatus comprising:
   at least one memory;
   one or more processor configured to:
   process and display said modified path for at least one of said paths in said set of realistic paths by multiplying each said coefficient of each said principle path by a respective random value to obtain a result, and to add the result to a corresponding vector of said centroid function, to generate the decomposition coefficients of a new path for display.

2. A method of displaying a modified path based on a path model, said method comprising:
obtaining a set of realistic paths, and expanding each path in said set of realistic paths on piece-wise polynomial basis to obtain an expanded representation of each said path,
calculating a respective centroid function and a sequence of eigenfunctions for each said expanded representation, and
calculating a set of principle paths representing the major variation of said set of realistic paths,
where said principle paths describe the variations of said set of realistic paths with respect to the respective said centroid function, and wherein said path model comprises a linear combination of said principle paths; and
multiplying each said coefficient of each said principle path by a respective random value to obtain a result, and adding the result to a corresponding vector of said centroid function, to generate the decomposition coefficients of a new path for display.

3. The method of claim 2 wherein said expanding each path into a linear combination of piece-wise polynomial basis functions comprises:
defining a first plurality of paths in terms of a second plurality of spline kernel locations and corresponding respective values,
gathering each said second plurality of spline kernel locations and corresponding respective values, as a single set of interpolation data.

4. The method of claim 2 wherein said expanding each path in said set of realistic paths on piece-wise polynomial basis to obtain an expanded representation of each said path comprises solving the spline smoothing problem on said linear combination of piece-wise polynomial basis functions.

5. The method of claim 2 wherein said calculating a set of principle paths comprises:
finding a first principle path representing the major variation of said set of realistic paths by determining the eigenfunction having the largest associated eigenvalue of the empirical covariance operator describing said set of realistic paths,
finding a further principle path representing the major variation of said set of realistic paths by determining the eigenfunction having the largest associated eigenvalue of the empirical covariance operator describing the difference between said first principle path and each said path of said set of realistic paths, and
repeating said finding a further principle path recursively by determining for each further principle path the eigenfunction having the largest associated eigenvalue of the empirical covariance operator describing the difference between the preceding principle path and each said path of said set of realistic paths, until the principal paths together represent a predetermined fraction of the total variance of said set of realistic paths.

6. The method of claim 5 wherein said predetermined fraction is between 85% and 99%.

7. The method of claim 5 wherein said determining the eigenfunction having the largest associated eigenvalue of the empirical covariance operator describing said set of realistic paths comprises reducing the integral Fredholm equation describing said empirical covariance of the projections of said set of realistic paths onto said first primary path by expansion on a finite basis to an ordinary eigenvalue problem.

8. The method of claim 2 further comprising applying a clustering analysis to a pool of paths to select the paths constituting said set realistic of paths.

9. The method of claim 8 wherein said clustering analysis uses a pyramidal clustering process.

10. A method of displaying a set of realistic paths, said method comprising defining said path model in accordance with the method of claim 2.

11. The method of claim 10 wherein said pairwise attraction is based on a linear interpolation.

12. A computer program product having computing instructions stored in a non-transitory computer storage medium wherein the computing instructions when executed by at least one processor is adapted to implement the method of claim 2.

* * * * *